Figure 1:
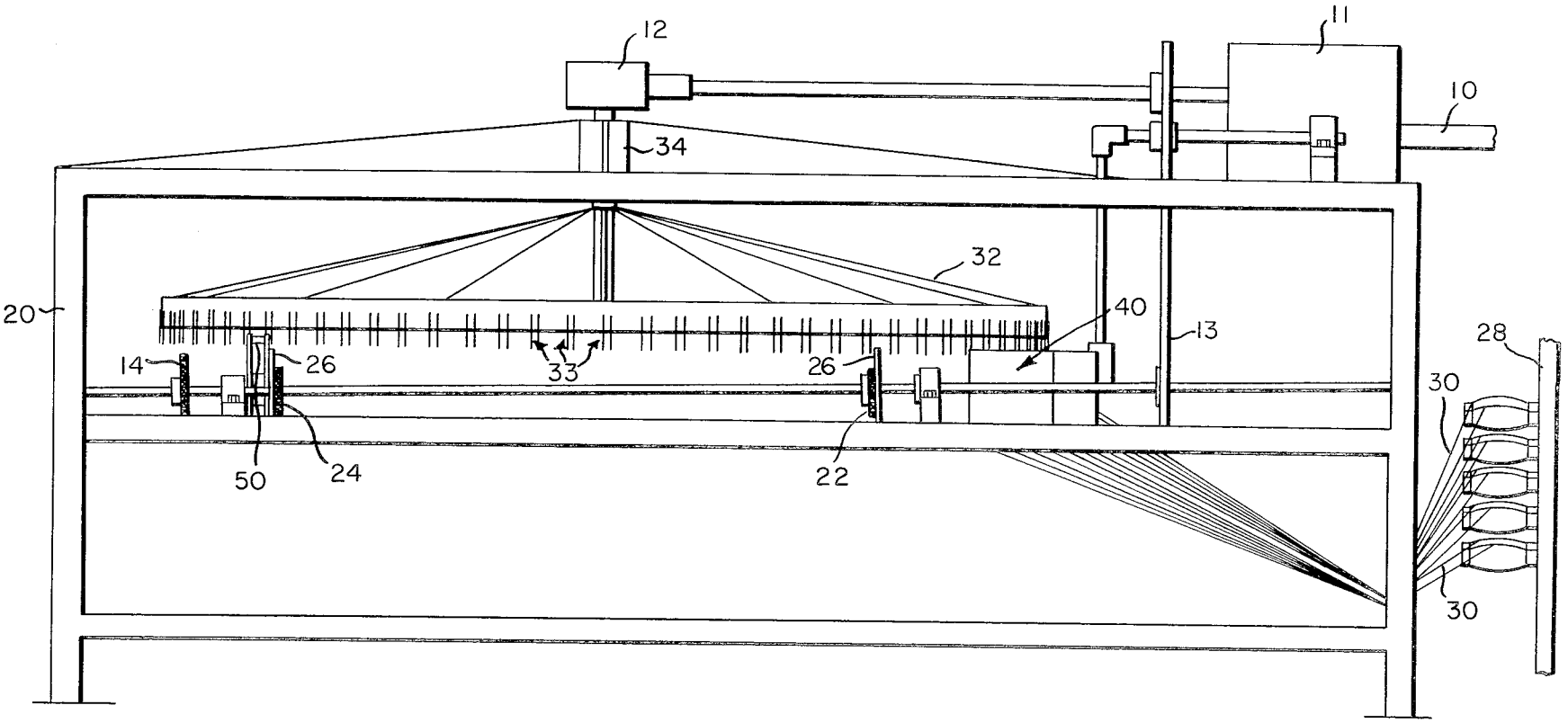
Figure 2:
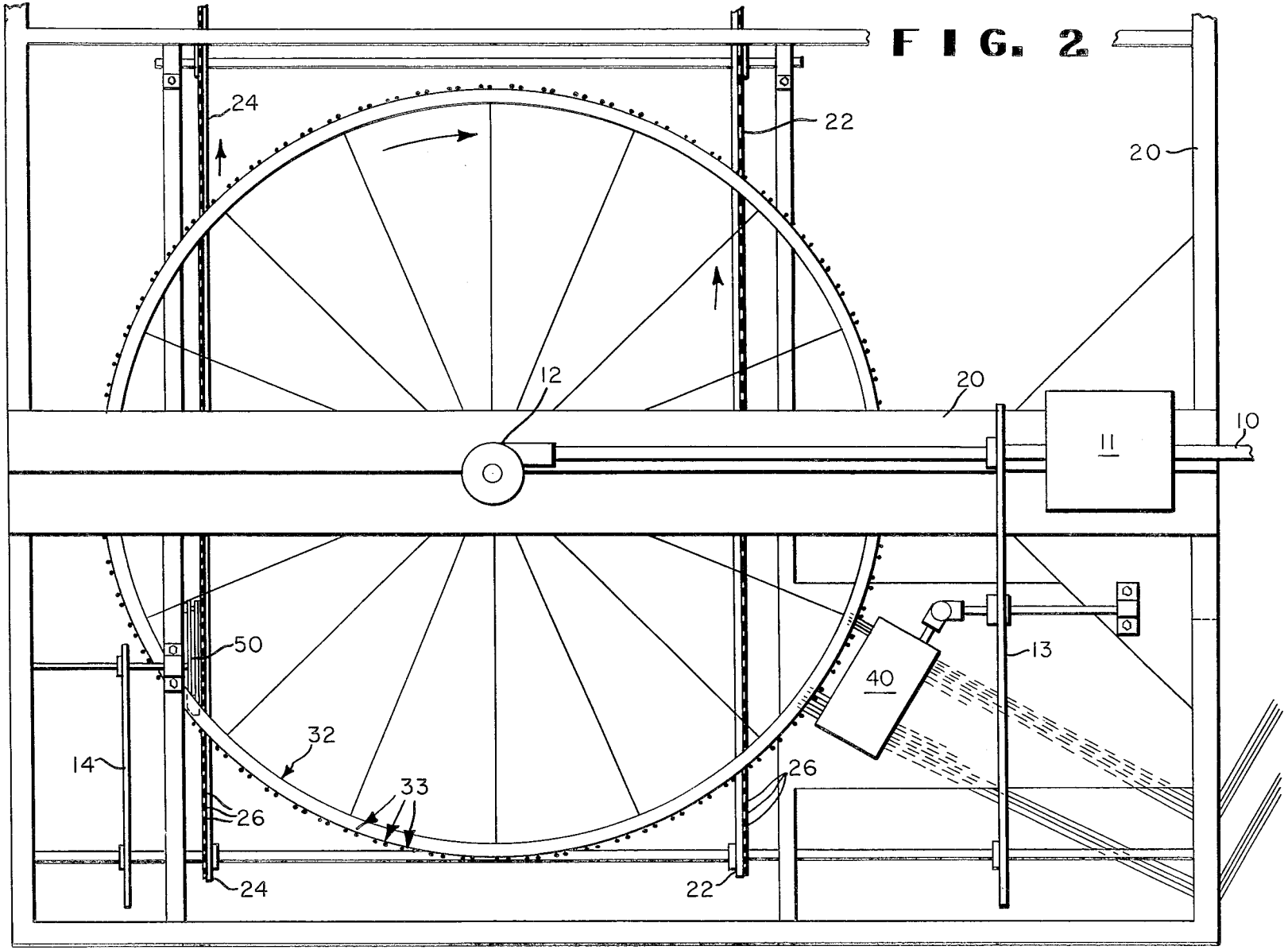
Figure 3:
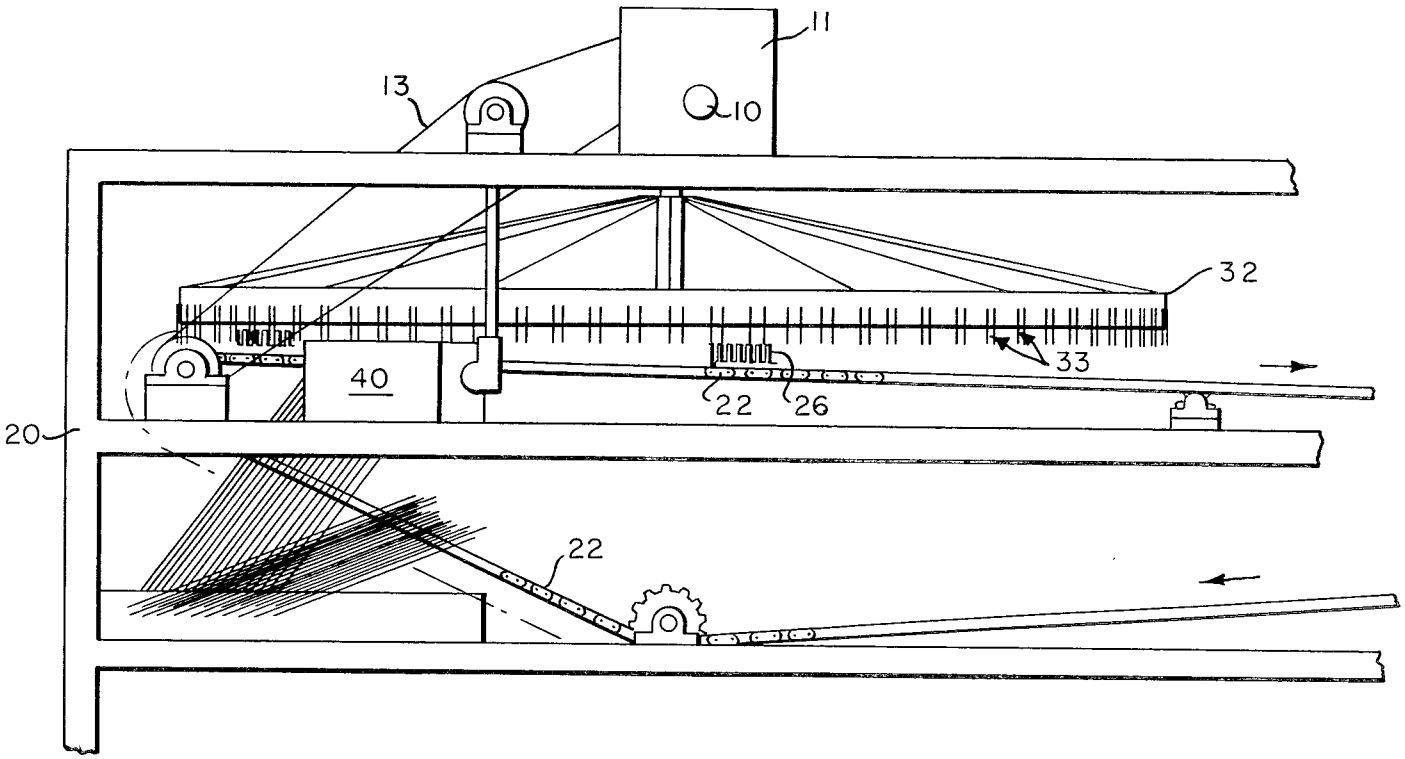
Figure 4:
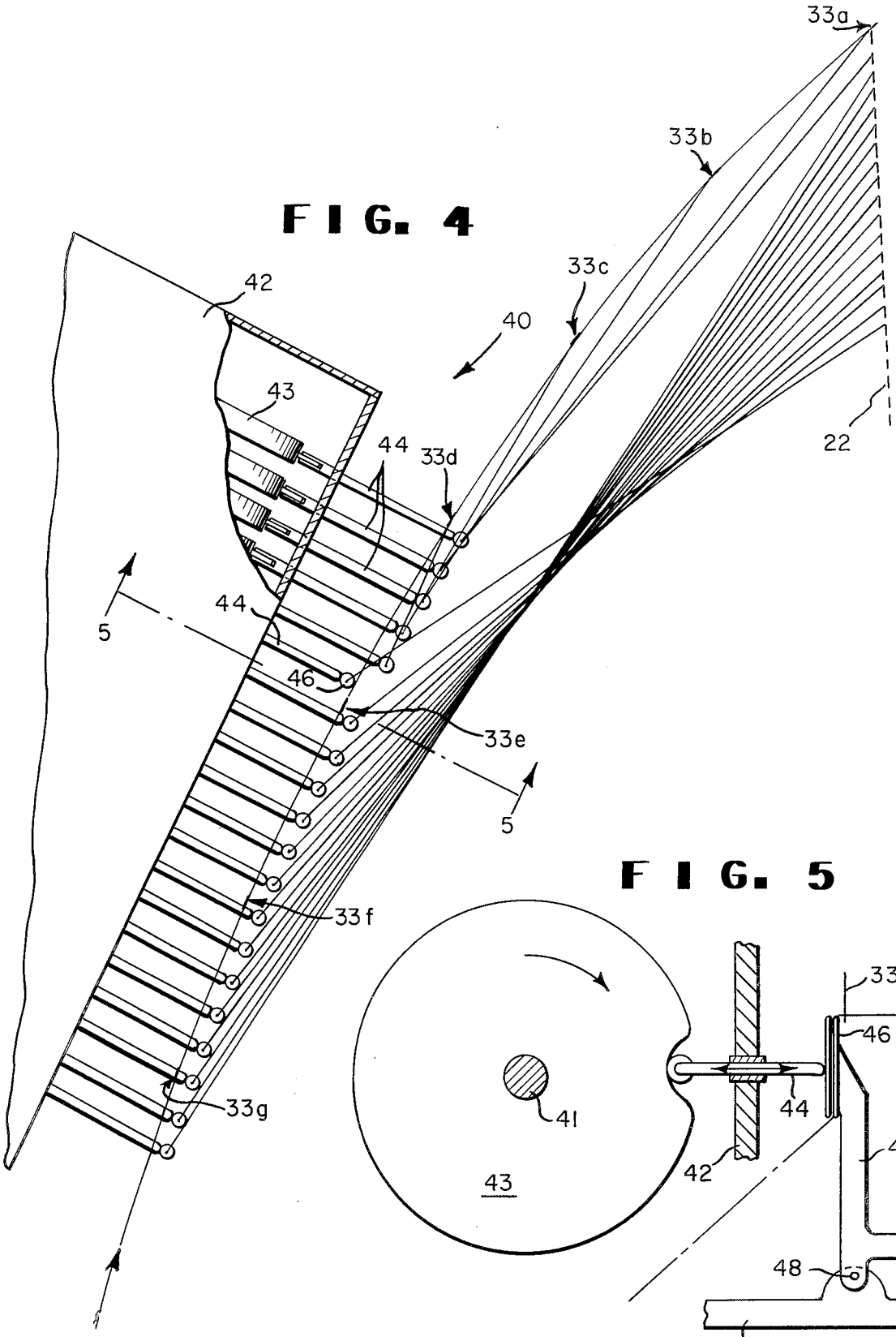
Figure 5:
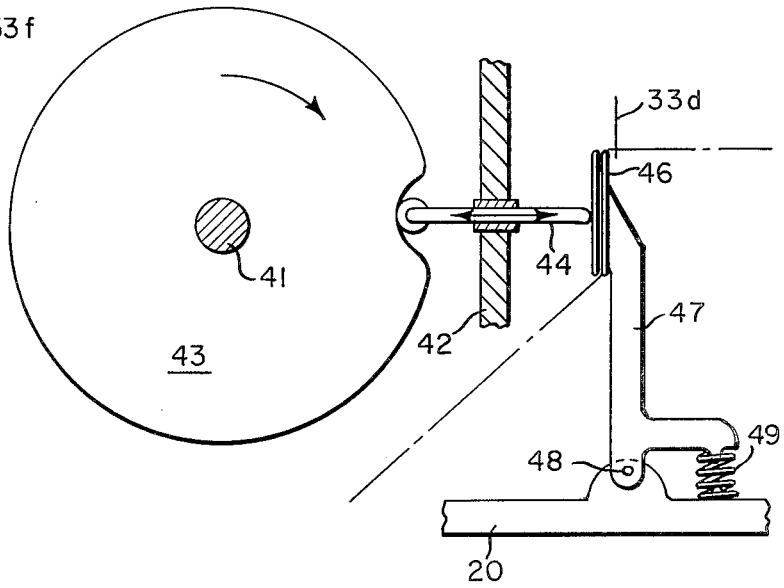
Figure 7:
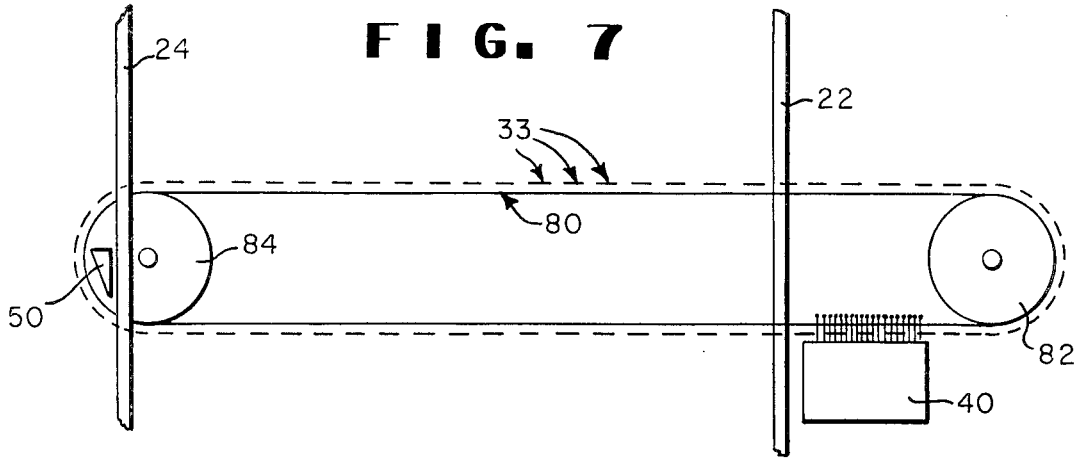
Figure 6:
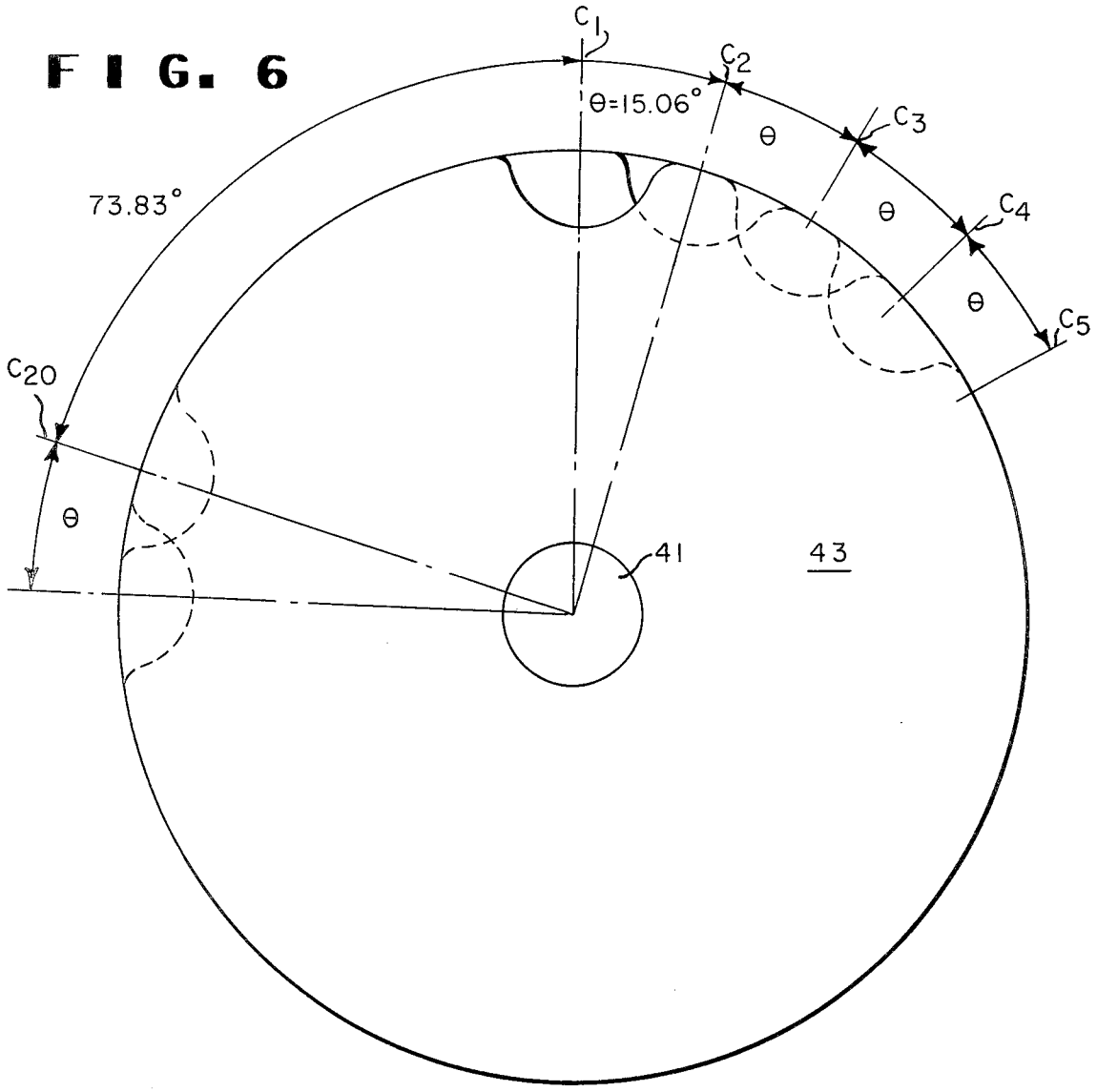

United States Defensive Publication [19] (H) [11] T966,001

Forsythe [43] Jan. 3, 1978

[54] APPARATUS AND METHOD FOR MULTIPLE STRAND WEB FORMATION

[75] Inventor: George Daniel Forsythe, Landenberg, Pa.

[73] Assignee: E. I. Du Pont de Nemours and Company, Wilmington, Del.

[21] Appl. No.: 800,431

[22] Filed: May 25, 1977

Related U.S. Application Data

[63] Continuation of Ser. No. 696,749, June 16, 1976, abandoned.

[51] Int. Cl.[2] ..... D04H 3/04

[52] U.S. Cl. ..... 28/100; 156/177; 156/439

[57] ABSTRACT

A method for traversing a plurality of strands between two spaced rows of strand-restraining elements moving together in the same direction in substantially the same plane to form a web is implemented by a plurality of strand transfer members moving in a single closed path spanning the rows of strand-restraining elements so that the members pass between strand-restraining elements on one of the rows and above them on the other row. There is a means provided for moving each strand back and forth across the path into engagement with the strand transfer members and a means for disengaging each strand from each strand transfer member beyond the other row and depositing it as a loop around at least one of the strand-restraining elements.

6 Claims, 7 Sheets Drawing,

14 Pages Specification

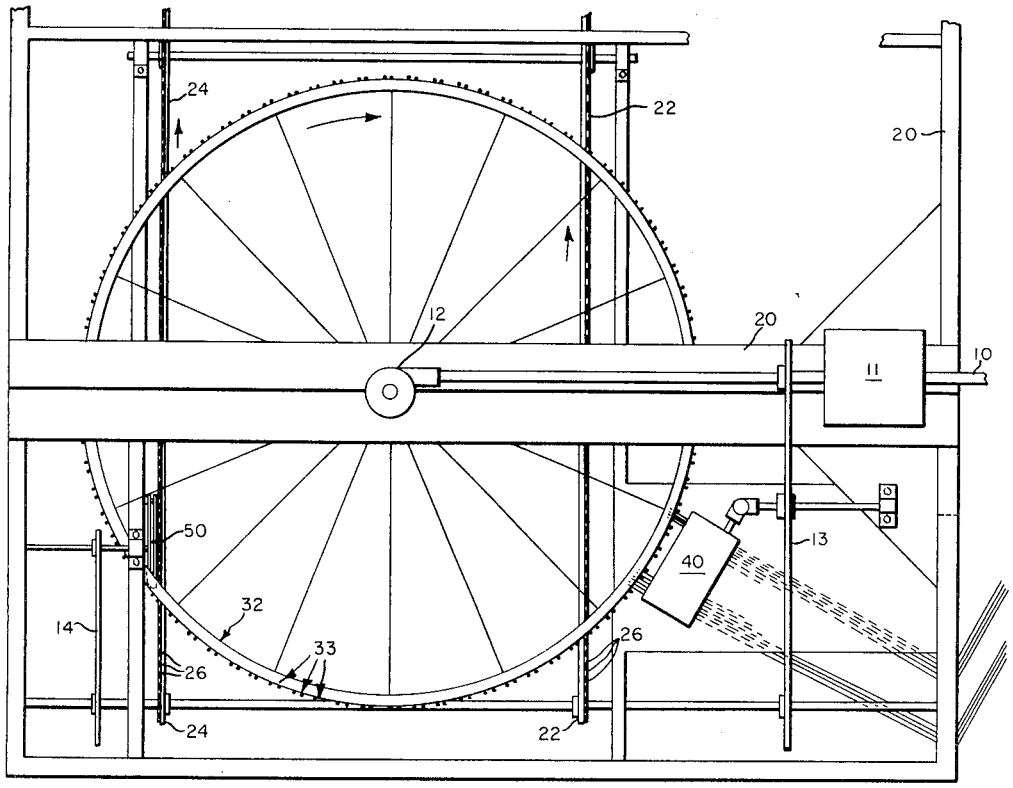

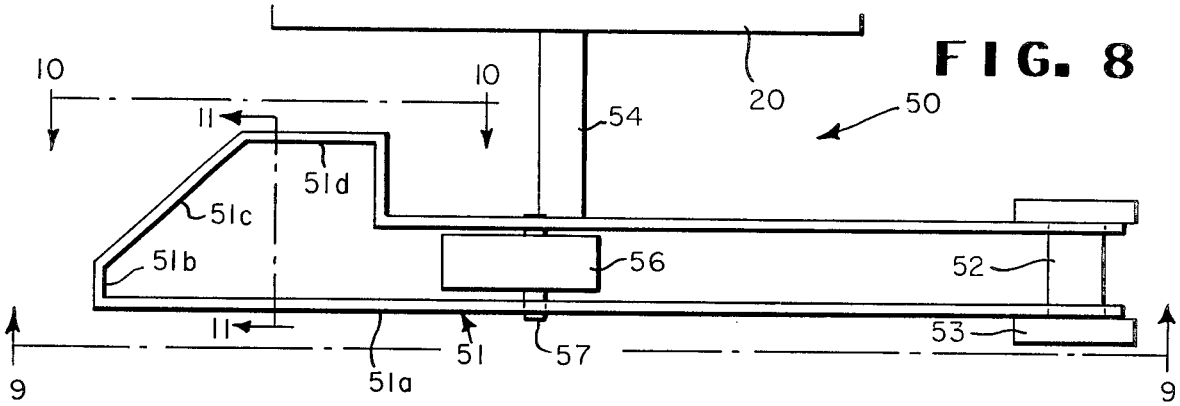
FIG. 8
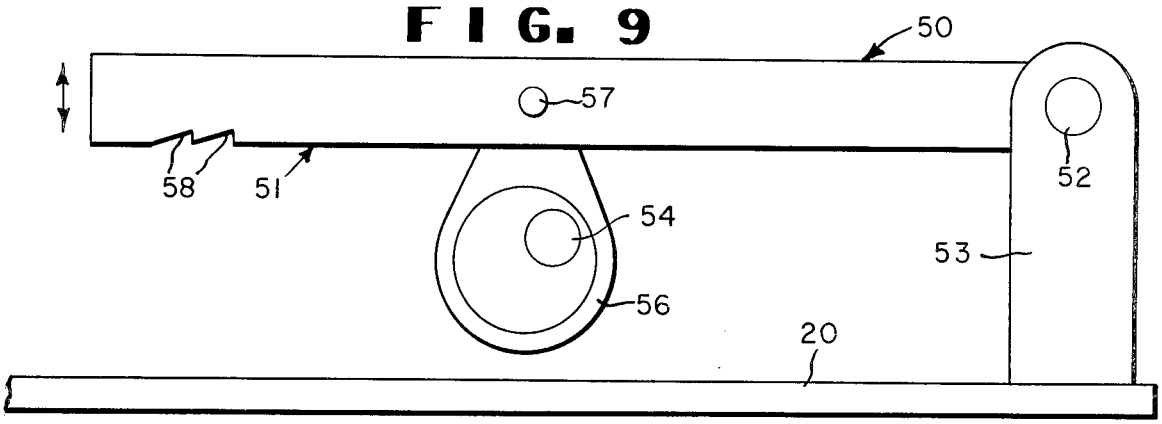
FIG. 9
FIG. 10
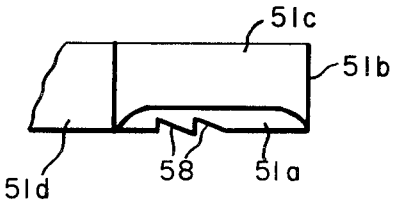
FIG. 11
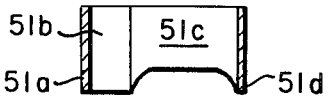

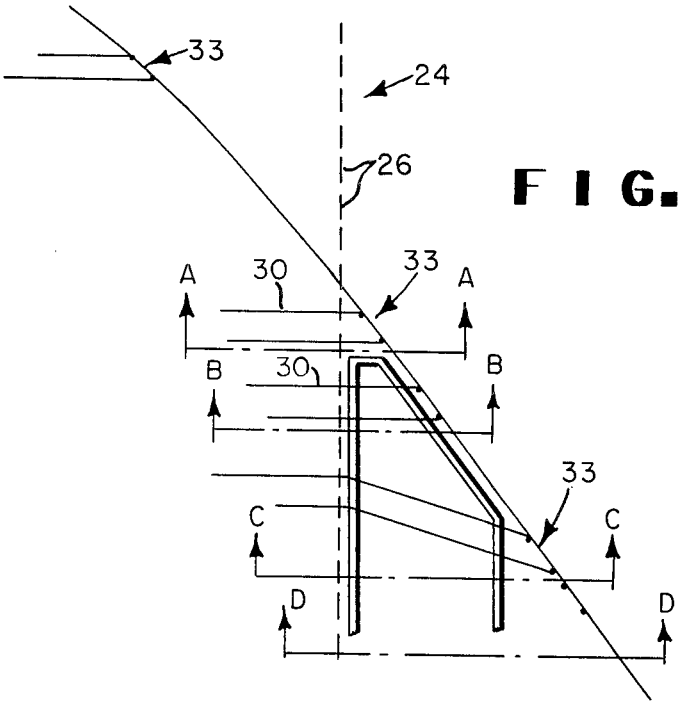
FIG. 12
FIG. 13
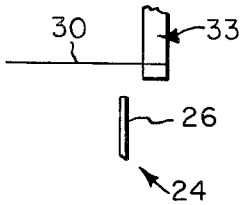
FIG. 14
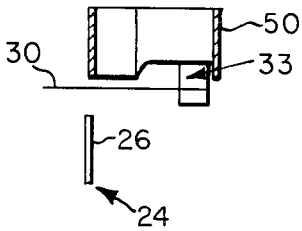
FIG. 15
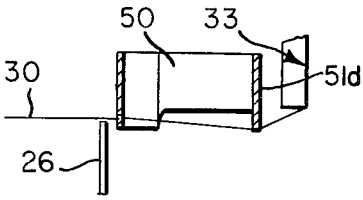
FIG. 16
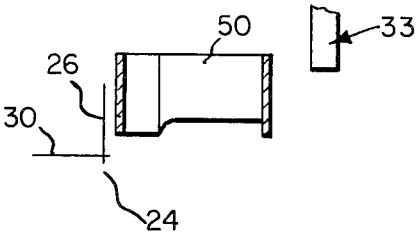

The file of this unexamined application may be inspected and copies thereof may be purchased (849 O.G. 1221, Apr. 9, 1968).